US006966006B2

(12) United States Patent
Pacheco et al.

(10) Patent No.: US 6,966,006 B2
(45) Date of Patent: Nov. 15, 2005

(54) ADAPTIVE STARTUP POLICY FOR ACCELERATING MULTI-DISK ARRAY SPIN-UP

(75) Inventors: Joaquin Fernando Pacheco, Holly Springs, NC (US); William Joseph Piazza, Apex, NC (US); Gregory Brian Pruett, Raleigh, NC (US); David B. Rhoades, Apex, NC (US); Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 10/142,142

(22) Filed: May 9, 2002

(65) Prior Publication Data

US 2003/0212857 A1    Nov. 13, 2003

(51) Int. Cl.$^7$ ............................................... G06F 1/26
(52) U.S. Cl. ...................................... 713/300; 713/330
(58) Field of Search ................................. 713/300, 330

(56) References Cited

U.S. PATENT DOCUMENTS

| 5,412,809 | A | * | 5/1995 | Tam et al. ................... 713/324 |
| 5,586,250 | A | | 12/1996 | Carbonneau et al. |
| 5,673,412 | A | | 9/1997 | Kamo et al. |
| 5,822,782 | A | | 10/1998 | Humlicek et al. |
| 5,842,027 | A | * | 11/1998 | Oprescu et al. ............. 713/300 |
| 5,950,230 | A | | 9/1999 | Islam et al. |
| 5,964,879 | A | * | 10/1999 | Dunstan et al. ............. 713/340 |
| 6,076,142 | A | | 6/2000 | Corrington et al. |
| 6,104,153 | A | | 8/2000 | Codilian et al. |
| 6,131,142 | A | | 10/2000 | Kamo et al. |
| 6,192,481 | B1 | | 2/2001 | Deenadhayalan et al. |
| 6,282,619 | B1 | | 8/2001 | Islam et al. |
| 6,286,108 | B1 | | 9/2001 | Kamo et al. |
| 6,295,565 | B1 | | 9/2001 | Lee |
| 6,330,687 | B1 | | 12/2001 | Griffith |
| 6,332,177 | B1 | | 12/2001 | Humlicek |
| 6,334,195 | B1 | | 12/2001 | DeKoning et al. |

OTHER PUBLICATIONS

American Megatrends Inc., et al, *System Management BIOS Reference Specification*, Mar. 16, 1999, pp. 6, 8-12, 27-30, 92-94, ver. 2.3.1.

* cited by examiner

*Primary Examiner*—Lynne H. Browne
*Assistant Examiner*—Tse Chen
(74) *Attorney, Agent, or Firm*—Martin J. McKinley; Dillon & Yudell LLP

(57) ABSTRACT

A method and system for adaptively implementing a disk drive startup sequence for a disk drive array. Prior to a next disk drive spin-up sequence a currently available power supply resource capacity and a startup metric of each of the array disk drives are determined. Each of the disk drives are scheduled into designated startup groups as a function of both the determined currently available power supply resource capacity and the determined startup metric. The scheduling of disk drives into designated startup groups includes determining an activation sequence timing schedule for each of the disk drives. The activation sequence timing schedule determines the relative times at which spindle motors for each of said plurality of disk drives will be activated as a function of the determined startup metric for each of the disk drives and the available power supply resource capacity as reduced by the steady state power requirements of each of the startup groups.

27 Claims, 10 Drawing Sheets

500

| BYTE | BIT | | | | | | | |
|---|---|---|---|---|---|---|---|---|
| | 7 | 6 | 5 | 4 | 3 | 2 | 1 | 0 |
| 0 | COMMAND OPCODE = 12h ||||||||
| 1 | LUN = 0 ||| Reserved = 0 |||| EVPD = 1 |
| 2 | Page Code = C4 ||||||||
| 3 | Reserved = 0 ||||||||
| 4 | Allocation Length ||||||||
| 5 | VU = 0 ||| Reserved = 0 |||| FLAG | LINK |

| BYTE | BIT | | | | | | | |
|---|---|---|---|---|---|---|---|---|
| | 7 | 6 | 5 | 4 | 3 | 2 | 1 | 0 |
| 0 | PERIPHERAL QUALIFIER ||| PERIPHERAL DEVICE TYPE |||||
| 1 | PAGE CODE = C4 ||||||||
| 2 | RESERVED = 0 ||||||||
| 3 | PAGE LENGTH = x h ||||||||
| 4-5 | Typical Start Time (ms) ||||||||
| 6-7 | Max Start Time (ms) ||||||||
| 8-9 | Max Start Up Current (12V) in milliamps (DC) ||||||||
| 10-11 | Max Start Up Current (12V) in milliamps (AC) ||||||||
| 12-13 | Max Idle Current in milliamps (DC) ||||||||
| 14-15 | Max Idle Current in milliamps (AC) ||||||||
| 16-17 | Max Seek Current in milliamps (DC) ||||||||
| 18-19 | Max Seek Current in milliamps (AC) ||||||||
| 20-21 | Max Steady State Current in milliamps (DC) ||||||||
| 21-22 | Max Steady State Current in milliamps (AC) ||||||||
| 23-x | Reserved ||||||||

Inquiry Data Format - EVPD 1, Page Code = C4. Power Parameter Page.

*Fig. 5B*

| Offset | Name | Length | Value | Description |
|---|---|---|---|---|
| 00h | Type | BYTE | 39 | Power Supply Record indicator. |
| 01h | Length | BYTE | Varies | Length of the structure, a minimum of 10h. |
| 02h | Handle | WORD | Varies | The handle, or instance number, associated with the power supply structure. |
| 04h | Power Unit Group | BYTE | Varies | Identifies the power unit group to which this power supply is associated. Specifying the same *Power Unit Group* value for more than one *System Power Supply* structure indicates a redundant power supply configuration. The field's value is 00h if the power supply is not a member of a redundant power unit, non-zero values imply redundancy and that at least one other power supply will be enumerated with the same value. |
| 05h | Location | BYTE | STRING | The number of the string that identifies the location of the power supply, e.g. "in the back, on the left-hand side" or "Left Supply Bay." |
| 06h | Device Name | BYTE | STRING | The number of the string that names the power supply device, e.g. "DR-36." |
| 07h | Manufacturer | BYTE | STRING | The number of the string that names the company that manufactured the supply. |
| 08h | Serial Number | BYTE | STRING | The number of the string that contains the serial number for the power supply. |

*Fig. 6A*

| 09h | Asset Tag Number | BYTE | STRING | The number of the string that contains the Asset Tag Number. |
|---|---|---|---|---|
| 0Ah | Model Part Number | BYTE | STRING | The number of the string that contains the OEM Part Order Number. |
| 0Bh | Revision Level | BYTE | STRING | Power supply Revision String, e.g. "2.30." |
| 0Ch | Max Power Capacity | WORD | Varies | Maximum sustained power output in Watts. Set to 0x8000 if unknown. Note that the units specified by the DMTF for this field are milliWatts. |
| 0Eh | Power Supply Characteristics | WORD | Varies | See 3.3.40.1. |
| 10h | Input Voltage Probe Handle | WORD | Varies | The handle, or instance number, of a *Voltage Probe (Type 26)* monitoring this power supply's input voltage. A value of 0xFFFF indicates that no probe is provided. |
| 12h | Cooling Device Handle | WORD | Varies | The handle, or instance number, of a *Cooling Device (Type 27)* associated with this power supply. A value of 0xFFFF indicates that no cooling device is provided. |
| 14h | Input Current Probe Handle | WORD | Varies | The handle, or instance number, of the *Electrical Current Probe (Type 29)* monitoring this power supply's input current. A value of 0xFFFF indicates that no current probe is provided. |

*Fig. 6B*

| BYTE | BIT | | | | | | | |
|---|---|---|---|---|---|---|---|---|
| | 7 | 6 | 5 | 4 | 3 | 2 | 1 | 0 |
| 0 | Number of Fans (f) | | | | | | | |
| 1 | Number of Power Supplies (p) | | | | | | | |
| 2 | Number of Device Slots (d) | | | | | | | |
| 3 | Door Lock Installed | | | | | | | |
| 4 | Number of Temperature Sensors (t) | | | | | | | |
| 5 | Speakers Installed | | | | | | | |
| 6-62 | Reserved | | | | | | | |
| 63 | Number of Vendor Specific Bytes (v) | | | | | | | |
| 64-x | Vendor Specific | | | | | | | |

*Fig. 7*

| Group | Drives | Startup Current | Steady State Current | Max Spin-Up Period | Start Time |
|---|---|---|---|---|---|
| 1 | 112a, 112b, 112c, 112d, 112e, 116a, 114a | 21.5 A | 9.25 A | $t_1-t_0$ | $t_0$ |
| 2 | 116b, 116c, 116d, 116e, 114b | 11.5 A | 4.75 A | $t_2-t_1$ | $t_1$ |
| 3 | 114c, 114d, 114e | 4.5 A | | | $t_2$ |

ADAPTIVE STARTUP POLICY FOR ACCELERATING MULTI-DISK ARRAY SPIN-UP

BACKGROUND OF THE INVENTION

1. Technical Field

The present invention relates in general to data storage systems, and in particular to reducing the time required for initializing a data storage array. More particularly, the present invention relates to a method and system for moderating a disk array startup sequence during a multi-disk power-up cycle. Still more particularly, the present invention relates to a method and system for adaptively determining and implementing a disk array startup policy that minimizes the time required to perform a multi-disk startup sequence in accordance with dynamic power supply capacity and spindle motor startup metrics.

2. Description of the Related Art

Disk drives attached to a Small Computer System Interface (SCSI) bus or a Peripheral Component Interconnect (PCI) bus may employ different configurations. "JBOD", an acronym for Just a Bunch of Drives referring to multiple hard disk drives connected to an adapter on the data processing unit with no special treatment of data among the drives, is one such configuration. A disk array or Redundant Array of Independent Disks (RAID), is a group of hard disk drives controlled by a single adapter/controller and combined to achieve higher transfer rates than a single drive, is another. In the latter configuration, even though multiple disks are controlled by one adapter, the RAID system appears as one drive to the host data processing system. Depending on the configuration, the RAID system will increase the level of protection and storage capacity for a data processing system over a single hard disk drive. The primary functions of the RAID system are to increase the availability, protection, and storage capacity of data from a data processing system.

High-end storage arrays, such as RAID arrays, have been widely implemented in support of large-scale single-user and multi-user data storage systems. The proliferation of networked (i.e. multi-user) data storage devices, such as within storage area networks (SANs), has given rise to the development of shared disk volume partitioning, sometimes referred to as virtual shared partitioning. Virtual shared partitioning facilitates seamless access from multiple, possibly geographically remote, client devices to multiple servers in which the multi-drive arrays reside. High performance partitioned data storage servers within individual Network Area Storage (NAS) facilities are the building blocks of current SANs.

Implementation of virtual shared partitioning within a given NAS facility often requires an adjustment, or realignment, of shared data resources. Some logical volume realignments can be implemented on-the-fly without the need to deactivate (i.e. power down) any of the currently active disk drive arrays. However, if the need for logical volume realignment results from, for example, a failure in a server hosting an object disk drive array, the "bad node" may have to be taken offline resulting in the object disk drive array having to be deactivated. Service operations, such as server updates or redeployment, may also necessitate the host server being taken offline, again resulting in the resident disk drive array being deactivated.

It is imperative for many business-related NAS applications, that the server down time be minimized to the extent possible. One source of delay in bringing a given server back online is the time required to perform the requisite power-on sequence (sometimes referred to as boot time) in which the drive array disks are "spun up". Disk drive spindle motors consume considerably more current during transient startup periods than during steady state spindle motor operations. The desire to minimize power supply costs, results in provision of power supply resources in conformity with the steady state power supply requirements. However, the aforementioned disparity in power supply requirements results in inadequate power supply resources to accommodate a simultaneous spin-up of all disks within a given drive array. Therefore, there is typically a need to determine an appropriate start up sequence in which power supply resources are not overtaxed at any given time during a disk drive power on interval.

The problem of determining an optimal disk drive startup sequence is addressed in U.S. Pat. No. 5,673,412, U.S. Pat. No. 6,131,142, and U.S. Pat. No. 6,286,108 B1, all issued to Kamo et al. (hereinafter "Kamo"). Specifically, Kamo addresses the need to moderate a disk drive startup procedure by predetermining a number of disk drives groups in a disk system and starting each of the constituent disk drive groups in a sequential manner. Fundamentally, Kamo's approach to disk array spin-up comprises dividing the disk drives into designated staggered startup time slots in accordance with the increasingly diminished power supply resources available as more drive groups are spun up. The object of Kamo's startup policy is to perform a disk drive array spin-up within a prescribed period of time while observing power supply limitations.

While providing a means to avoid overtaxing power supply resources, the disk drive startup sequence as described by Kamo does not address several key factors that affect the ultimate efficiency, in terms of reducing array spin-up time, of the selection of disk drive startup groups. One such factor, is the spin-up time required by each of the individual disk drives which constitute a given startup group. In addition to failing to incorporate individual drive spin-up times as part of the drive group selection function, Kamo's drive array startup policy does not address optimizing the disk drive startup group determination to dynamically (between each distinct disk drive array startup interval) account for interim changes in power supply capacity and individual drive power consumption requirements.

It can therefore be appreciated that a need exists to address the foregoing deficiencies in prior art disk array spin-up procedures. The present invention addresses such a need by implementing an adaptive disk drive array startup procedure that accounts for updated power supply capacity metrics as well as updated disk drive startup metrics each of which significantly contributes to a startup sequence policy that is dynamically suited to minimizing the overall time required to spin-up a disk drive array.

SUMMARY OF THE INVENTION

A method and system for adaptively implementing a disk drive startup sequence for a disk drive array are disclosed herein. Prior to a next disk drive spin-up sequence a currently available power supply resource capacity and a startup metric of each of the array disk drives are determined. Each of the disk drives are scheduled into designated startup groups as a function of both the determined currently available power supply resource capacity and the determined startup metric. The scheduling of disk drives into designated-startup groups includes determining an activation sequence timing schedule for each of the disk drives.

The activation sequence timing schedule determines the relative times at which spindle motors for each of said plurality of disk drives will be activated as a function of the determined startup metric for each of the disk drives and the available power supply resource capacity as reduced by the steady state power requirements of each of the startup groups.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5A depicts an exemplary data format of a SCSI INQUIRY command in accordance with a preferred embodiment of the present invention;

FIG. 5B illustrates an exemplary data format of a power parameter page which is accessed utilizing the SCSI INQUIRY command to retrieve disk drive power and spin-up metric information in accordance with a preferred embodiment of the present invention;

FIG. 6 depicts a conventional system management BIOS structure that specifies power supply information for a local system;

FIG. 7 illustrates the specification structure of a SCSI Accessed Fault-Tolerant Enclosure response to a Read Enclosure Configuration command;

FIG. 8A depicts a tabularized representation of an activation sequence timing schedule determined in accordance with a preferred embodiment of the present invention.

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations maybe accomplished in view of these teachings without deviating from the spirit or scope of the present invention.

As explained in further detail with reference to the figures, the present invention is directed to improving multi-disk array startup procedures. Preferred embodiments are illustrated and described herein in the context of a Redundant Array of Independent Disks (RAID) data storage architecture. It should be noted, however, that the inventive principles disclosed herein are more widely applicable to any multi-disk architectures in which a start-up sequencing schedule is required to avoid overtaxing available power supply resources.

Figure 1:
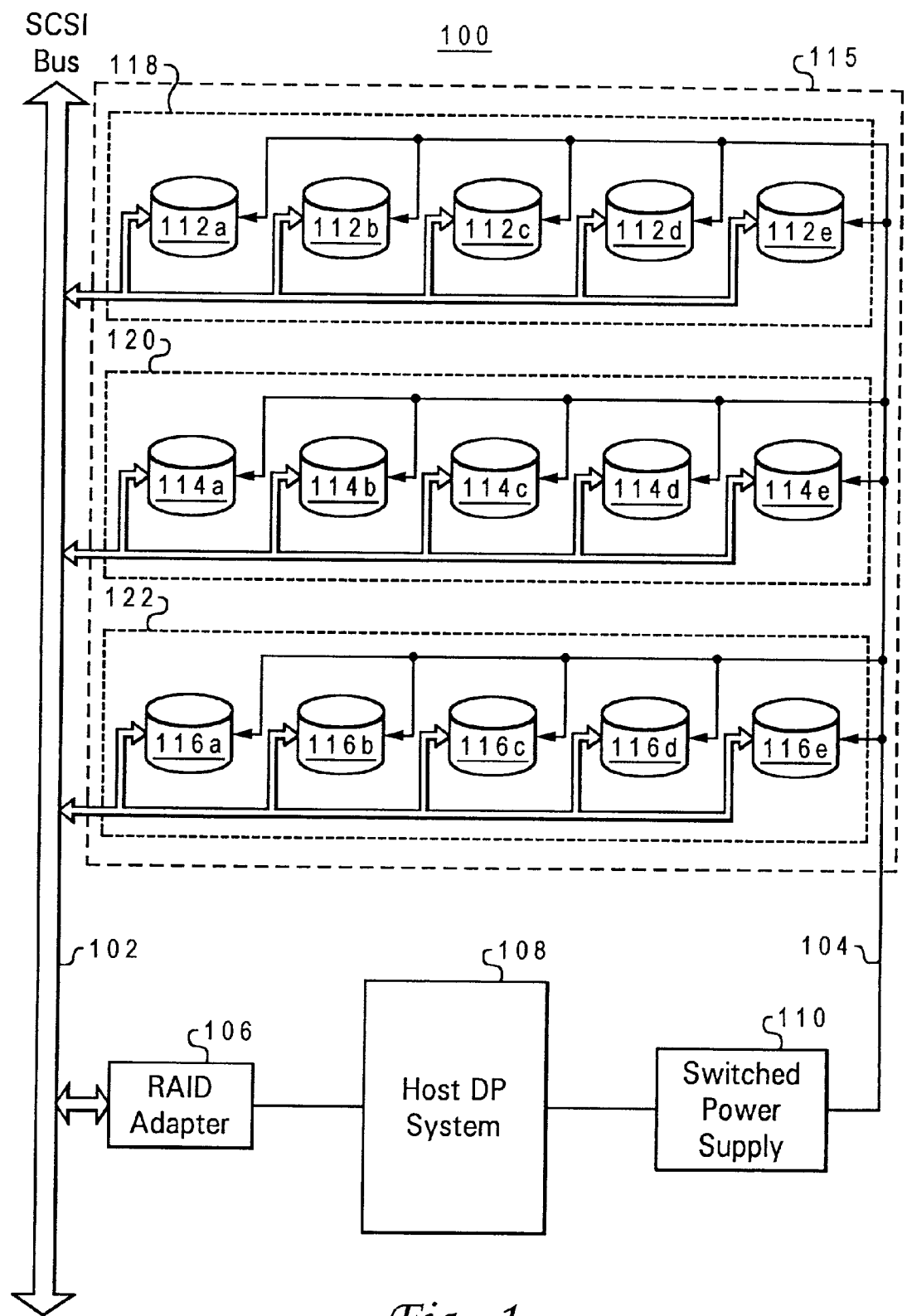
FIG. 1 is a high-level depiction of a data storage subsystem in which a preferred embodiment of the present invention may be implemented.

With reference now to the figures, and in particular with reference to FIG. 1, there is depicted a high-level representation of a data storage subsystem in which a preferred embodiment of the present invention may be implemented. Specifically, a RAID subsystem 100 is illustrated which includes a Small Computer System Interface (SCSI) bus 102, although alternate bus architectures are also compatible with the spirit and scope of the present invention. RAID subsystem 100 includes an array of disk drives 115 divided into three parity groups 118, 120, and 122. Each of parity groups 118, 120, and 122, comprises five disk drives, 112a–112e, 114a–114e, and 116a–116e, respectively. The disk drives are electro-mechanically attached to RAID subsystem 100 by plugging them into open slots or bays (not depicted), which are typically arranged in banks.

As further illustrated in FIG. 1, disk drives 112a–112e, 114a–114e, and 116a–116e are communicatively coupled to a host data processing system 108 via SCSI bus 102 and a RAID adapter/controller 106. A switched power supply 110 provides DC electrical power to the devices within RAID subsystem 100, including disk drives 112a–112e, 114a–114e, and 116a–116e. In practice, the power supply source for host data processing system 108 and RAID adapter 106 may be distinct from that supplying the disk drive spindle motors of the resident disk drives. However, such a distinction is irrelevant to the inventive principles set forth herein.

Although not explicitly depicted in FIG. 1, host data processing system 108 includes a processor, memory, and input/output devices. Those skilled in the art will appreciate that each of disk drives 112a–112e, 114a–114e, and 116a–116e typically includes a head disk assembly (HDA) and a printed circuit board assembly (PCBA) coupled to the HDA. The HDA includes at least one disk and a spindle motor. The PCBA includes circuitry for controlling operation of the spindle motor. In a disk array such as that depicted in FIG. 1, the PCBA receives a fixed DC voltage for powering disk drives 112a–112e, 114a–114e, and 116a–116e from switched power supply 110.

FIG. 1 further illustrates a common power supply interface 104 supplying electrical power from switched power supply 110 to each of the disk drives within disk drive array 115. It should be noted, however, that in accordance with conventional disk array power supply schema, electrical connectivity from switched power supply 110 may be selectively applied to one or more of the disk drives at a given time. This selectivity is provided by enabling each of the disk drives within disk drive array 115 to receive electrical power to its spindle motor only upon receipt of a "spin-up" command received from RAID adapter 106 via SCSI bus 102. In this manner, RAID adapter 106, acting independently or under instruction from host data processing system 108, determines the times at which electrical power is supplied from switched power supply 110 to each of disk drives 112a–112e, 114a–114e, and 116a–116e.

Figure 2:
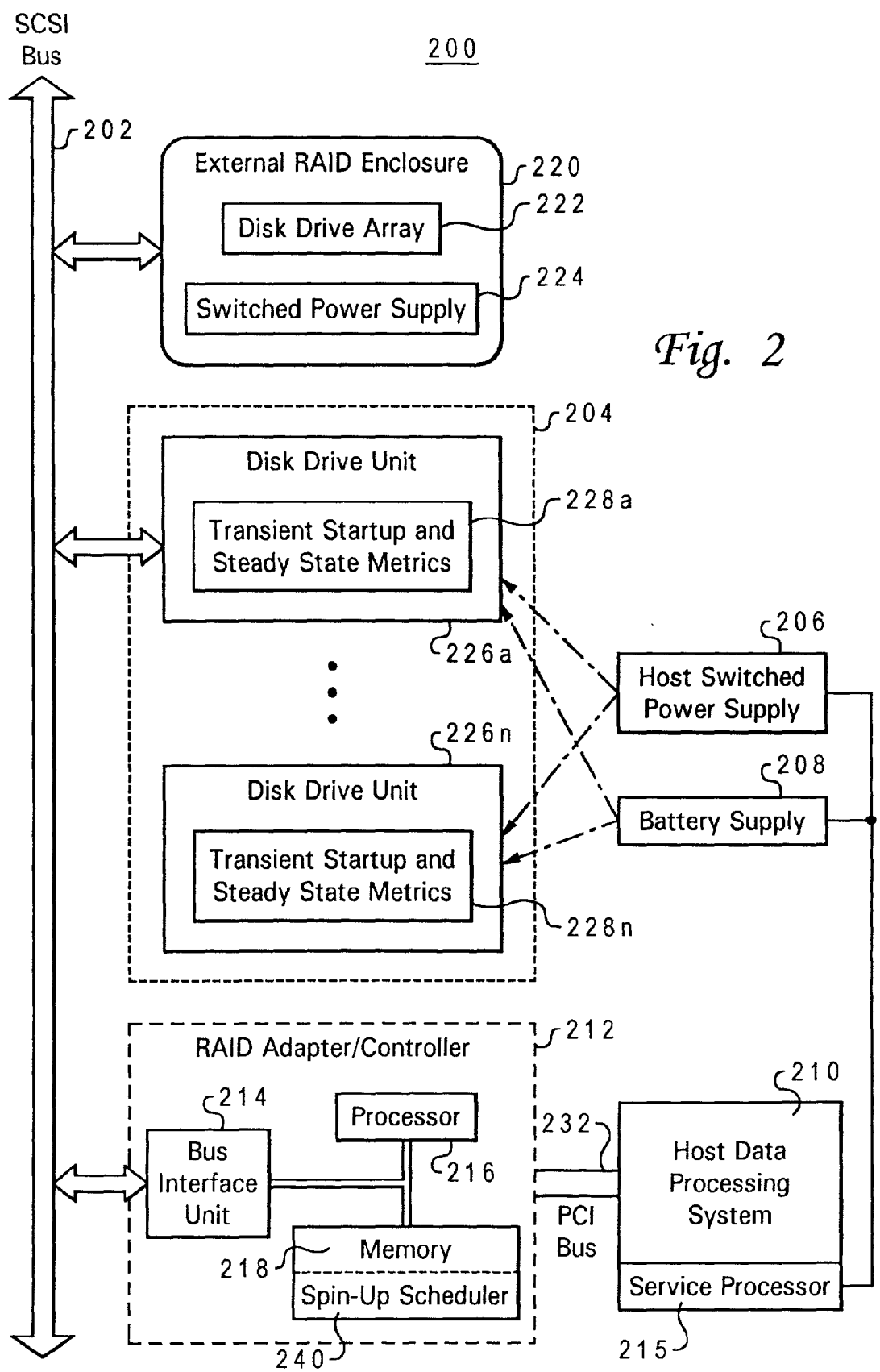
FIG. 2 is a block diagram illustrating a system for implementing adaptive disk power-on sequencing in accordance with a preferred embodiment of the present invention.

Referring to FIG. 2, there is depicted a block diagram illustrating a system for implementing adaptive disk power-on sequencing in accordance with a preferred embodiment of the present invention. Specifically, FIG. 2 depicts a server system 200 which includes a RAID adapter 212 that interfaces a host data processing system 210 with both a local RAID 204 and an external RAID 222 via a SCSI bus 202 and a Peripheral Component Interface (PCI) bus 232. Those skilled in art will appreciate that although a specific host system, adapter architecture, disk storage devices, and system interconnects are illustrated, the inventive principles disclosed herein are not limited to these particular implementations. For example, although a PCI bus and SCSI bus are described with reference to the preferred embodiment, other communication means such as Fibre Channel, IDE, or other proprietary communication busses or links may be alternately employed.

RAID adapter 212 may be disposed in an enclosure within host data processing system 210, and is typically fabricated as a single printed circuit board. RAID adapter 212 includes a controller CPU 216, a bus interface unit 214, and adapter memory 218. Although omitted to simplify the figure, one or more SCSI controllers (alternately referred to as SCSI channels) will typically be included within RAID adapter 212 to facilitate communication between the disk drives and a processor 216 within RAID adapter 212. Local RAID 204 includes multiple disk drives 226a–226n which receive spindle motor power from a host switched power supply 206. A battery supply source 208 provides a backup source of DC power to the units within local RAID 204. External RAID 222 receives spindle motor power from a switched power supply 224 within an external RAID enclosure 220.

As explained with reference to FIG. 1, the spindle motor power for a multi-drive array may be independently applied to one or more of the disk drives in accordance with SCSI spin-up commands issued from the RAID adapter to each of the disk drive units. In the embodiment depicted in FIG. 2, such selective application of spindle motor power is implemented in accordance with an activation sequence timing schedule program 240 stored within memory 218 of RAID adapter 212. Activation sequence timing schedule program 240 includes algorithmic steps explained in further detail with reference to FIGS. 3 and 4 for adaptively implementing a disk drive startup sequence for the disk drives within local RAID 204 and external RAID 222.

In accordance with the preferred embodiment depicted in FIG. 2, each of disk drives 226a–226n maintains an internally stored file containing disk drive operating metrics for the respective drive. These files are illustrated as power parameter pages 228a–228n within disk drives 226a–226n, respectively. In accordance with the depicted embodiment, the disk drives contained within external RAID 222 also include individual power parameter pages. As explained in further detail with reference to FIGS. 3, 4, 5A, and 5B, the power parameter pages store disk drive operating metrics including transient startup and steady state characteristics of the respective disk drives. In one embodiment of the present invention, the transient operating metrics stored within each of the power parameter pages include all or any combination of the spin-up time, the startup current, and the startup voltage required for the respective drive. In addition, each power parameter page may include steady state metrics such as the steady state current and voltage requirements of the respective disk drive.

FIG. 5B illustrates an exemplary data format of a power parameter page 550 which is stored in association with each of the disk drive units. As depicted in FIG. 5B, power parameter page 550 includes a page code field, and multiple power parameter fields specifying the maximum values of startup and steady state current for the object drive. In addition, power parameter page 550 includes start time fields specifying the maximum and typical spin-up times for the spindle motor of the object drive.

The power parameter pages within each of the disk drives of local disk drive array 204 and external disk drive array 222 may be stored in a dedicated and write protected segment of the disk storage medium on the respective disk drive. Alternately, the power parameter pages maybe stored in non-volatile memory (e.g. ROM, EPROM, etc.) of the local disk drive controller (not depicted) for each of the respective drives.

As explained in further detail with reference to FIGS. 3, 4, 6, and 7, the power supply resource capacity available for disk drive spindle motor operation is stored and accessed as needed within server system 200. The power supply resource capacity data are retrieved prior to a next power-on sequence of server system 200 to facilitate adaptive spin-up sequence scheduling as described in further detail below. To this end, the present invention employs a local and an external system power supply capacity information retrieval mechanism as follows. To determine the power supply resource capacity available for spindle motor operation within local RAID 200, a service processor 215 within host data processing system 210 directly queries host switched power supply 206 and battery supply 208 to determine the currently available current and voltage specifications of each. In accordance with one embodiment of the present invention, the local power supply resource data is stored within a power supply controller/driver (not depicted) associated with each of host switched power supply 206 and battery 208, and is accessed therefrom by service processor 215. In the alternative, and in a preferred embodiment, the local power supply information is retrieved by host data processing system 210 using a Power-On Self-Test (POST) call to the local switched and battery supplies. Specifically, a system management Basic Input Output System (SMBIOS) call can be used during a power-on sequence of host data processing system 210 to obtain the power supply metrics for the local supplies. FIG. 6 depicts the format of an SMBIOS Type 39 structure 600, conforming to the requirements of SMBIOS specification 2.3.1, which specifies power supply information for the local system. As depicted in FIG. 6, SMBIOS structure 600 includes a power unit group field which identifies the power unit group to which the object power supply is associated. Activation sequence timing schedule program 240 uses the power unit group field to associate the local power supplies (i.e. local switched power supply 206 and battery supply 208) with the spin-up schedule of the drives within local RAID 204, and to associate the external supply 224 with the spin-up schedule of the drives within external RAID 222.

To determine the power supply resource capacity available to external RAID 222, a specialized SCSI protocol, such as the SCSI Accessed Fault-Tolerant Enclosures (SAFTE), may be employed to communicate with external RAID enclosure 220. RAID adapter 212 issues a Read Enclosure Configuration command containing the SCSI identification of external RAID enclosure 220 prior to a power-on sequence. The SCSI adapter associated with external RAID enclosure (not depicted) responds to the Read Enclosure Configuration command with a configuration response. Referring to FIG. 7, there is illustrated the specification structure of a SAF-TE response 700 to a Read Enclosure Configuration command. As per SAF-TE convention, enclosure configuration response 700 includes fields specifying the number of power supplies in addition to other enclosure parameters and flags. To implement the external power supply resource retrieval mechanism of the present invention, the power supply resource capacity of switched power supply 224 maybe encoded as a manufacturer's specification within the Vendor Specific field of enclosure configuration response 700.

After POST computes the retrieved power supply information, the SMBIOS structure 600 is passed to RAID adapter 212 to enable RAID adapter 212 to determine and implement a disk drive spin-up sequence schedule for the next power-on cycle. One or more power supply resource metrics encoded within SMBIOS structure 600 are utilized in combination with operating metrics for associated disk drives (i.e. metrics for external RAID 222 utilized with power supply resource metrics for switched power supply 224, and metrics for local RAID 204 utilized with power supply resource metrics for switched power supply 206 and battery 208) to determine a spin-up sequence schedule that minimizes the duration of a spin-up cycle for the disk drives within local RAID 204 and external RAID 222. Activation sequence timing schedule program 240 is preferably maintained in a non-volatile portion of RAID adapter memory 218 and is accessible by bootstrap program stored thereon. In this manner, activation sequence timing schedule program 240 computes the relative times at which spindle motors for each of the disk drives within local RAID 204 and external RAID 222 will be activated as a function of the retrieved disk drive operating metrics and the available power supply resource capacity.

Figure 3:
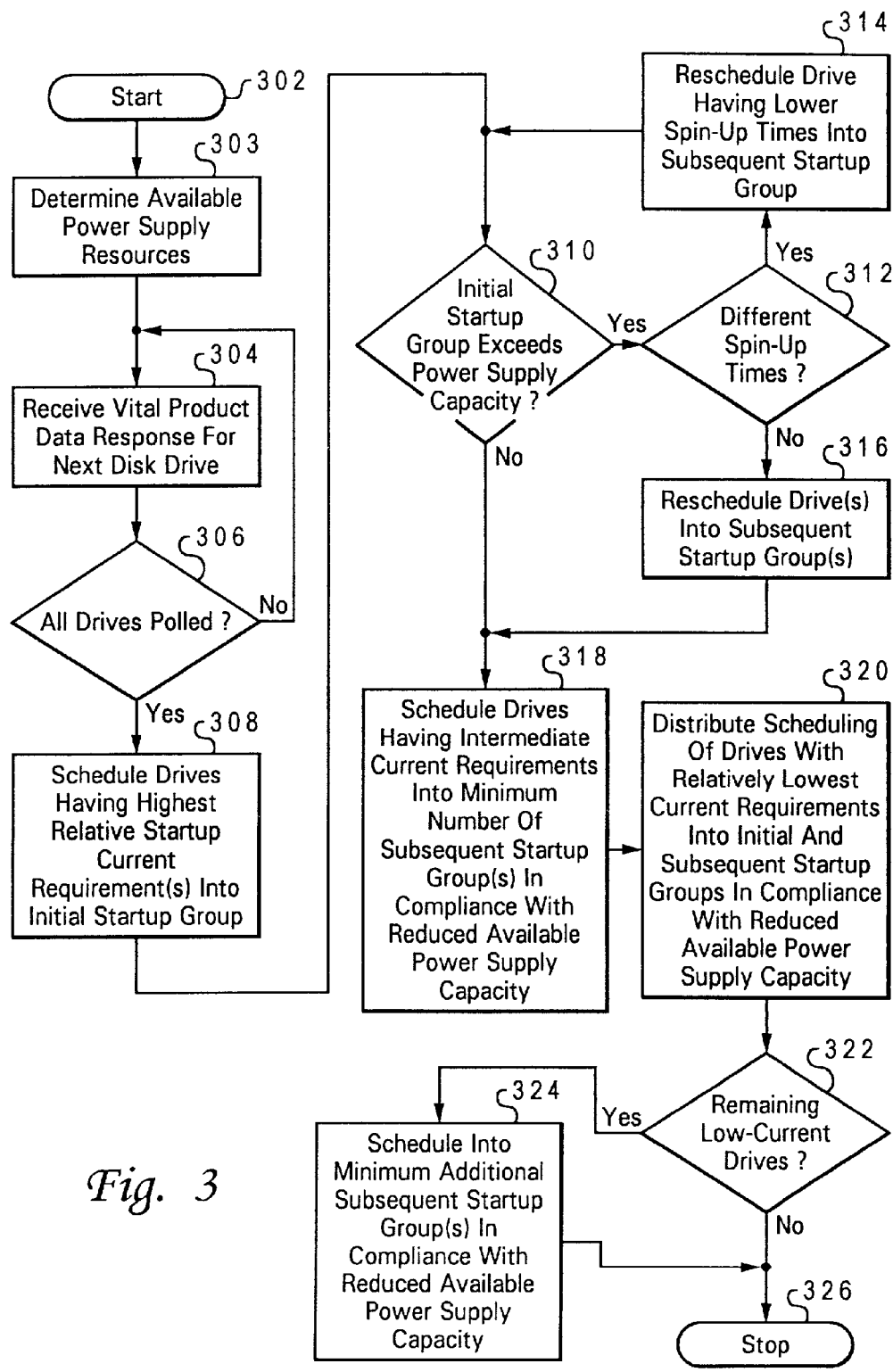
FIG. 3 is a flow diagram depicting process steps for adapting an activation sequence timing schedule in accordance with determined power and disk spin-up metrics.

As explained in further detail with reference to FIGS. 3, 4, 5A, and 5B, a disk drive spin-up sequence schedule is adaptively determined prior to each power-on sequence of server system 200. Referring now to FIG. 3, there is illustrated a flow diagram depicting process steps for adapting an activation sequence timing schedule in accordance with determined power and disk spin-up metrics. The process begins as shown at step 302 and proceeds to step 303 which depicts RAID adapter 212 determining the power supply resources available to local RAID 204 and external RAID 222. Depending on the power supply distribution scheme employed within server system 200, different methods may be employed for this determination. If, for example, one or more power supply units are dedicated to supplying the object disk drives, the power supply capacity determination may be made directly by obtaining the power supply device output ratings. If, however, the power supply devices for the disk drives are shared with other system resources (e.g. processor, memory, network, adapter, etc.), the available power supply determination at step 303 will require subtracting the power metrics consumed by the other system resources from the cumulative power supply ratings of the shared power supplies.

Proceeding to step 304, the disk drives with local RAID 204 and external RAID 222 are polled by RAID adapter 212 to retrieve a vital product data response for the most recently polled drive. As explained with reference to FIG. 2, RAID adapter 212 may issue SCSI INQUIRY commands, such as that depicted in FIG. 5A, to retrieve the disk drive operating metrics during the polling process. The vital product data includes disk drive operating metrics such as spin-up time, transient startup parameters (e.g. startup current and voltage requirements), and steady state power parameters (e.g. steady state current and voltage requirements). FIG. 5B illustrates an exemplary data format of a power parameter page 550 which may be accessed utilizing the SCSI INQUIRY command to retrieve disk drive power and spin-up metric information for each drive. Mechanisms for requesting and retrieving the disk drive operating parameters are explained in further detail with reference to FIG. 4.

As illustrated at steps 306 and 308, after all of the disk drives have been polled, the sub-process of determining a spin-up sequence schedule commences by scheduling disk drives identified as having a highest value or range of startup current requirements into an initial startup group. As utilized herein, the initial startup group comprises the disk drives that will be activated first during a given spin-up sequence. Identification and scheduling of drives having the highest startup current requirements into the initial startup group is motivated by the incremental reduction in power supply current resources resulting from the steady state operations of drive groups which have been brought on-line.

Proceeding to step 310, a determination is made of whether or not the power requirements of the initial startup group exceeds the available power supply capacity. If so, and as depicted at step 312 a further determination is made of whether or not the drives scheduled in the initial startup group have differing spin-up time metrics. Disk drives having lower spin-up times are rescheduled into one or more subsequent startup groups until the initial startup group complies with the available power supply capacity (step 314). If the initial startup group exceeds the available power supply capacity and the spin-up times are the same, one or more drives are rescheduled into a subsequent startup group in accordance with other power metric specifications or arbitrarily (step 316).

Continuing at step 318, disk drives having intermediate startup current requirements (relative to the aforementioned high startup requirements and the lowest startup current requirements) are scheduled into the initial startup group and a minimum number of subsequent startup groups in compliance with the specified power supply resource capacity and the power supply capacity as reduced by the steady state current requirements of the initial startup group. The scheduling process continues with remaining lowest startup current drives being scheduled first to fill any unfilled gaps in the initial and subsequent startup groups, with the remaining drives scheduled in a minimum number of startup groups in compliance with the power supply resource capacity as reduced by the steady state current requirements of the preceding startup groups (steps 322 and 324). The effect of the foregoing scheduling process is to maximize utilization of the available power supply capacity at any given time during a spin-up sequence, thereby minimizing the number of sequentially started groups and the time required to spin-up all the disk drives. After all drives have been scheduled, the scheduling process terminates as depicted at step 326.

Figure 4:
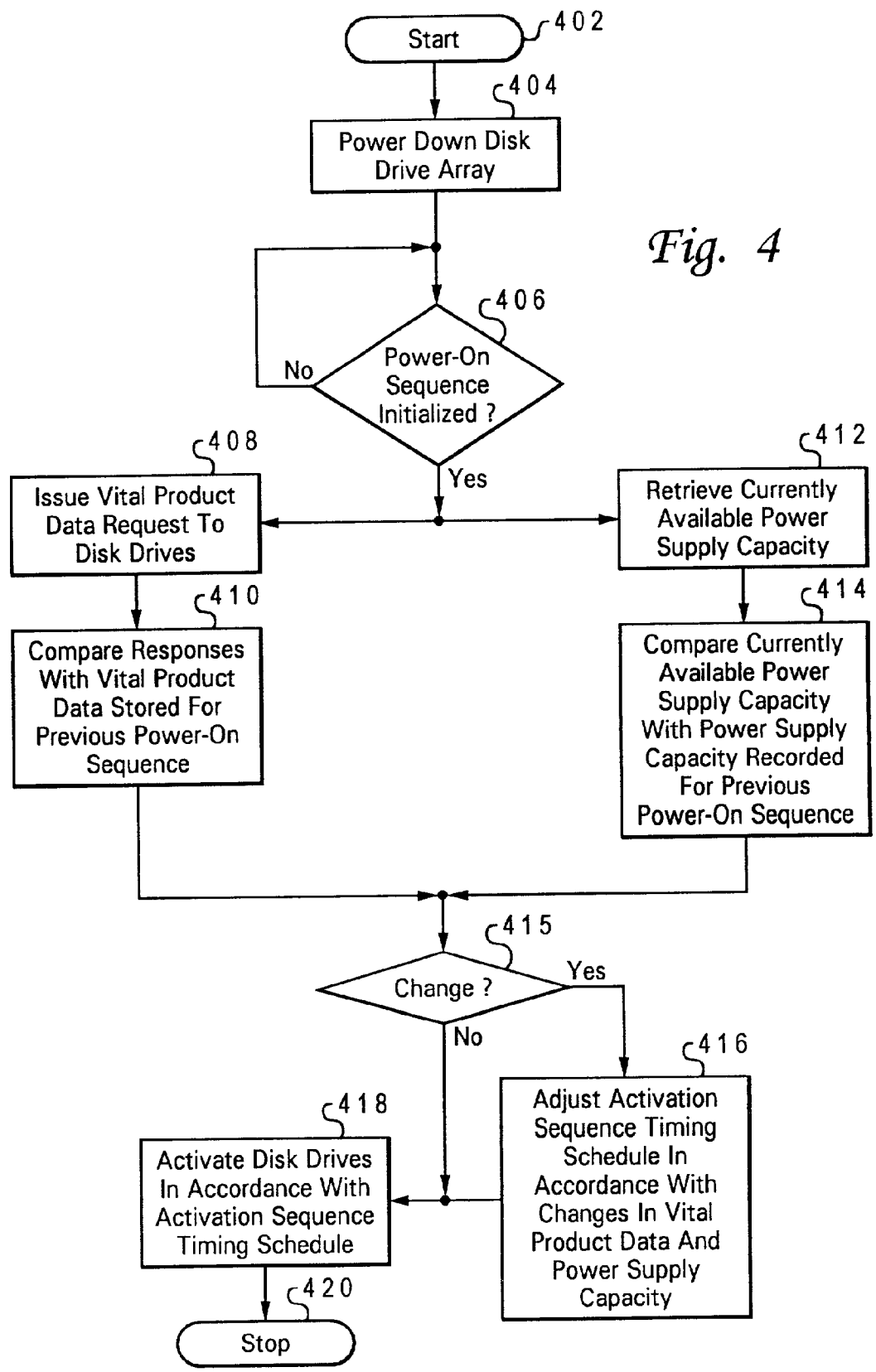
FIG. 4 is a flow diagram illustrating process steps for adapting an activation sequence timing schedule in accordance with changes, from a last power-up sequence, to power and disk spin-up metrics.

With reference to FIG. 4, there is depicted a flow diagram illustrating process steps implemented by server system 200 for adapting an activation sequence timing schedule in accordance with changes, from a last power-up sequence, to power and disk spin-up metrics. The process begins at step 402 and proceeds to step 404 depicting local RAID 204 and external RAID 222 being deactivated and the resident disks spun-down. Next, as illustrated at steps 406 and 408, in response to a power-on sequence being initiated for host data processing system 210, RAID adapter 212 issues a SCSI INQUIRY command to each of the disk drives within RAIDs 204 and 222. FIG. 5A depicts an exemplary data format of a SCSI INQUIRY command 500 in accordance with a preferred embodiment of the present invention. The SCSI INQUIRY command issued by RAID adapter 212 requests disk drive operating parameters from each of the respective disk drives. SCSI INQUIRY command 500 includes an enable vital product data (EVPD) flag, which when set, specifies that the target disk drive shall return the vital product data specified by the page code field. Referring to FIG. 5B in conjunction with 5A, the page code field for a given SCSI INQUIRY command is set to the page code of the desire power parameter page (C4 in the depicted embodiment).

Returning to FIG. 4, and in an important feature of the present invention, the values of the disk drive metrics encoded in the responses received from the SCSI Inquiry commands are compared to the previously stored values of the same metrics to determine whether or not they have changed (step 410). As depicted at step 412, RAID adapter 212 also receives the available power supply capacity available from switched power supplies 206 and 224 and battery supply 208. As illustrated at step 414, the newly received power supply resource metrics are compared to previously stored power supply resource values to determine whether, for example, a power supply has been added to the local or external RAID, or whether a power supply has been replaced with a power supply having a different set of parameters.

Next at step 415, a determination is made of whether or not the power supply or disk drive operating metrics have changed as evidenced by the results of the comparisons performed at steps 410 and 414. If no changes in power supply capacity or disk drive operating metrics are apparent from the comparison, the spin-up sequence is commenced in accordance with the current activation sequencing timing schedule at step 418. If, however, either the available power supply resource capacity or the disk drive operating metrics have changed, the activation sequence timing schedule is redetermined (i.e. adjusted) in accordance with the scheduling process depicted in FIG. 3, and the spin-up sequence is commenced in accordance with the modified activation sequence timing schedule at step 418. The process terminates as illustrated at step 420.

For the embodiment depicted in FIG. 1, the spin-up sequence entails RAID adapter 106 first issuing a SCSI spin-up command to all drives in the initial startup group. After a predetermined interval (typically determined in accordance with the longest spin-up time of the drives in the initial startup group), RAID adapter 106 issues a command to all drives in the subsequent startup group. This process is repeated until all of the startup groups have been activated.

Referring to FIG. 8A, there is depicted a tabularized representation of an activation sequence timing schedule 800 determined in accordance with the process steps illustrated in FIGS. 3 and 4 performed with respect to RAID subsystem 100 of FIG. 1. In the depicted example, it is assumed that the power supply resource availability determined at step 303 of FIG. 3 is 22 A for switched power supply 110. It is further assumed that the disk drive operating metrics retrieved by RAID adapter 106 include maximum startup and steady state current requirements. Specifically, it is assumed that each of disk drives 112a–112e has a maximum startup current of 3.5 A and a steady state current of 1.5 A. Each of disk drives 116a–116e has a maximum startup current of 2.5 A and a steady state current of 1 A. Finally, each of drives 114a–114e has a maximum startup current of 1.5 A and a steady state current of 0.75 A.

Figure 8B:
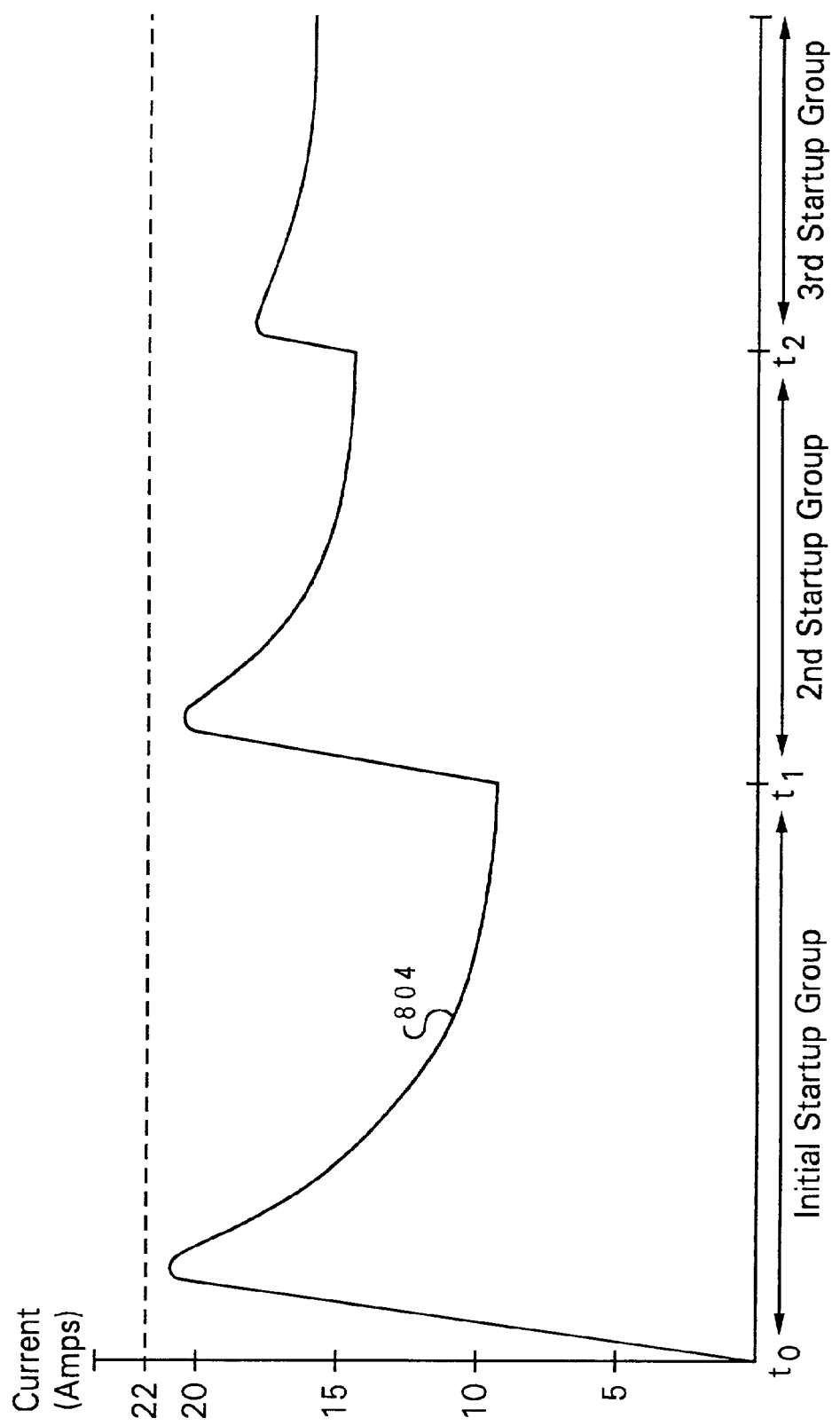
FIG. 8B illustrates a temporal representation of a spin-up sequence profile in accordance with the activation sequence timing schedule of FIG. 8A.

In a preferred embodiment, an activation sequence timing schedule program (similar to activation sequence timing schedule program 240) operates with processing functionality in RAID adapter 106 to determine three disk drive startup groups in activation sequence timing schedule 800. As depicted in FIG. 8A, all five of the highest startup current drives, 112a–112e have been scheduled in Group 1 (i.e. initial startup group). A gap of 4.5 A (22–17.5) remains for the initial startup group. After the highest startup current drives have been scheduled into a minimum number of groups (one in this example), intermediate startup current drives 116a–116n are scheduled into the remaining gap in the first startup group and a minimum number of subsequent startup groups (Group 2 in this example). As further illustrated in FIG. 8B, the power supply resources available to subsequent startup groups is reduced by the steady state current requirements of previously started groups. Subsequent to the highest and intermediate startup current drives have been scheduled, the lowest startup current drives 114a–114n are scheduled to fill any remaining gaps in the established groups 1 and 2 and a minimum number of additional groups (Group 3 in this example). Activation sequence timing schedule 800 further includes the relative times at which each of the three startup groups will be started. As depicted in FIG. 8A, these startup times are determined in accordance with the maximum spin-up time parameters for the drives in the immediately preceding startup group.

The results of the scheduling determined by activation sequence timing schedule 800 is illustrated in the power supply current draw profile in FIG. 8B. Specifically, a current draw profile 804 represents the combined current draws of each of the three startup groups as the groups are sequentially started at times determined from activation sequence timing schedule 800. As illustrated in FIG. 8B, the scheduling of the three startup groups remains in compliance with the maximum current limit of 22 A. For the purposes of startup sequence illustration in FIG. 8B, it is assumed that the 22 A maximum is exclusive of the power supply requirements of other system components. It should be noted that for the embodiment depicted in FIG. 2, two such activation sequence schedules will be required to spin-up both local RAID 204 and external RAID 222, since independent power supply restrictions apply to the drives in either RAID.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of computer processing systems within one or more networked nodes. Until required by the computer system, the set of instructions may be stored as a computer-program product in another computer memory, for example, in a disk drive (which may include a removable memory such as an optical disk or floppy disk for eventual utilization in disk drive).

A method and system have been disclosed for adaptively determining and adjusting a multi-disk spin-up sequence. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for adaptively implementing a disk drive startup sequence for a disk drive array, comprising:
  prior to an $N^{th}$ disk drive spin-up sequence:
    determining a currently available power supply resource capacity including comparing the current value of the available power supply resource capacity with the previous value of the available power supply resource capacity as determined prior to an $(N-1)^{th}$ disk drive spin-up sequence; and determining a startup metric of each of a plurality of disk drives within said disk drive array including comparing the current value of said startup metric of each of said plurality of disk drives with the previous value of said startup metric for each of said plurality of disk drives as determined prior to an $(N-1)^{th}$ disk drive spin-up sequence; and scheduling each of said plurality of disk drives into designated startup groups in accordance with relative changes in either or both said startup metric for each of said plurality of disk drives and said currently available power supply resource capacity.

2. The method of claim 1, wherein said scheduling said plurality of disk drives into designated startup groups further comprises determining an activation sequence tinting schedule for each of said plurality of disk drives, wherein said activation sequence timing schedule determines the relative times at which spindle motors for each of said plurality of disk drives will be activated as a function of said determined startup metric for each of said plurality of disk drives and the available power supply resource capacity as reduced by the steady state power requirements of each of said start up groups.

3. The method of claim 2, wherein said startup metric is a transient startup power requirement, said method further comprising:

determining a steady state power requirement for each of said plurality of disk drives; and determining said activation sequence timing schedule as a function of said determined available power supply capacity, said transient startup power requirement, and said determined steady state power requirement.

4. The method of claim 2, further comprising activating each of said disk drive startup groups at relative startup sequence times determined in accordance with said activation sequence timing schedule.

5. The method of claim 1, wherein said determining a currently available power supply resource capacity comprises determining a currently available electrical current capacity of at least one power supply that supplies said disk drive array.

6. The method of claim 1, wherein said determining a startup metric of each of said plurality of disk drives comprises determining a transient startup current parameter for each of said plurality of disk drives.

7. The method of claim 6, wherein said scheduling said plurality of disk drives into designated disk drive startup groups, further comprises:

scheduling disk drives having relatively highest transient startup current parameters into an initial startup group and a minimum number of subsequent startup groups in compliance with said currently available power supply resource capacitor, scheduling disk drives having intermediate transient startup current parameters into a minimum number of one or more subsequent startup groups in compliance with said currently available power supply resource capacity; and scheduling disk drives having relatively lowest transient startup current parameters among said initial startup group and said subsequent startup groups to minimize the number of sequentially activated startup groups required to empty with said determined power supply resource capacity.

8. The method of claim 1, wherein said determining a startup metric of each of said plurality of disk drives comprises determining a spin-up time parameter for each of said plurality of disk drives.

9. The method of claim 8, wherein said scheduling said plurality of disk drives into designated disk drive startup groups, further comprises:

scheduling disk drives having relatively longest spin-up times into an initial startup group and a minimum number of subsequent startup groups in compliance with said currently available power supply resource capacity;

scheduling disk drives having intermediate spin-up times into a minimum number of subsequent startup groups in compliance with said currently available power supply resource capacity; and scheduling disk drives having relatively shortest spin-up times among said initial startup group and said subsequent startup groups to minimize the number of sequentially activated startup groups required to comply with said determined power supply resource capacity.

10. A system for adaptively implementing a disk drive startup sequence for a disk drive array, comprising:

processing means activated prior to an $N^{th}$ disk drive spin-up sequence for:

determining a currently available power supply resource capacity including comparing the current value of the available power supply resource capacity with the previous value of the available power supply resource capacity as determined prior to an $(N-1)^{th}$ disk drive spin-up sequence; and determining a startup metric of each of a plurality of disk drives within said disk drive array including comparing the current value of said startup metric of each of said plurality of disk drives with the previous value of said startup metric for each of said plurality of disk drives as determined prior to an $(N-1)^{th}$ disk drive spin-up sequence: and processing means for scheduling each of said plurality of disk drives into designated startup groups in accordance with relative changes in either or both said startup metric for each of said plurality of disk drives and said currently available power supply resource capacity.

11. The system of claim 10, wherein said processing means for scheduling said plurality of disk drives into designated startup groups further comprises processing means for determining an activation sequence timing schedule for each of said plurality of disk drives, wherein said activation sequence timing schedule determines the relative times at which spindle motors for each of said plurality of disk drives will be activated as a function of said determined startup metric for each of said plurality of disk drives and the available power supply resource capacity as reduced by the steady state power requirements of each of said startup groups.

12. The system of claim 11, wherein said startup metric is a transient startup power requirement said system further comprising:

processing means for determining a steady state power requirement for each of said plurality of disk drives; and processing means for determining said activation sequence timing schedule as a function of said determined available power supply capacity, said transient startup power requirement, and said determined steady state power requirement.

13. The system of claim 11, further comprising processing means for activating each of said disk drive startup groups at relative startup sequence times determined in accordance wit said activation sequence timing schedule.

14. The system of claim 10, wherein said processing means for determining a currently available power supply resource capacity comprises processing means for determining a currently available electrical current capacity of at least one power supply that supplies said disk drive array.

15. The system of claim 10, wherein said processing means for determining a start-up metric of each of said plurality of disk drives comprises processing means for determining a transient startup current parameter for each of said plurality of disk drives.

16. The system of claim 15, wherein said processing means for scheduling said plurality of disk drives into designated disk drive startup groups, further comprises:
processing means for scheduling disk drives having relatively highest transient startup current parameters into an initial startup group and a minimum number of subsequent startup groups in compliance with said currently available power supply resource capacity;
processing means for scheduling disk drives having intermediate transient startup current parameters into a minimum number of one or more subsequent startup groups in compliance with said currently available power supply resource capacity; and
processing means for scheduling disk drives having relatively lowest transient startup current parameters among said initial startup group and said subsequent start-up groups to minimize the number of sequentially activated startup groups required to comply with said determined power supply resource capacity.

17. The system of claim 10, wherein said processing means for determining a startup metric of each of said plurality of disk drives comprises processing means for determining a spin-up time parameter for each of said plurality of disk drives.

18. The system of claim 17, wherein said processing means for scheduling said plurality of disk drives into designated disk drive startup group~, further comprises:
processing means for scheduling disk drives having relatively longest spin-up times into an initial startup group and a minimum number of subsequent startup groups in compliance with said currently available power supply resource capacity;
processing means for scheduling disk drives having intermediate spin-up times a minimum number of subsequent start-up groups in compliance with said currently available power supply resource capacity; and
processing means for scheduling disk drives having relatively shortest spin-up times among said initial startup group and said subsequent startup groups to minimize the number of sequentially activated startup groups required to comply with said determined power supply resource capacity.

19. A program product for adaptively implementing a disk drive startup sequence for a disk drive array, comprising:
program instruction means activated prior to an $N^{th}$ disk drive spin-up sequence for:
determining a currently available power supply resource capacity including comparing the current value of the available power supply resource capacity with the previous value of the available power supply resource capacity as determined prior to an $(N-1)^{th}$ disk drive spin-up sequence; and
determining a startup metric of each of a plurality of disk drives within said disk drive array including comparing the current value of said startup metric of each of said plurality of disk drives with the previous value of said startup metric for each of said plurality of disk drives as determined prior to an $(N-1)^{th}$ disk drive spin-up sequence; and
program instruction means for scheduling each of said plurality of disk drives into designated startup groups in accordance with relative changes in either or both said startup metric for each of said plurality of disk drives and said currently available power supply resource capacity.

20. The program product of claim 19, wherein said program instruction means for scheduling said plurality of disk drives into designated startup groups further comprises program instruction means for determining an activation sequence timing schedule for each of said plurality of disk drives, wherein said activation sequence timing schedule determines the relative times at which spindle motors for each of said plurality of disk drives will be activated as a function of said determined startup metric for each of said plurality of disk drives and the available power supply resource capacity as reduced by the steady state power requirements of each of said startup groups.

21. The program product of claim 20, wherein said startup metric is a transient startup power requirement, said program product further comprising:
program instruction means for determining a steady state power requirement for each of said plurality of disk drives; and
program instruction means for determining said activation sequence timing schedule as a function of said determined available power supply capacity, said transient startup power requirement, and said determined steady state power requirement.

22. The program product of claim 20, further comprising program instruction means for activating each of said disk drive start-up groups at relative startup sequence times determined in accordance with said activation sequence timing schedule.

23. The program product of claim 19, wherein said program instruction means for determining a currently available power supply resource capacity comprises program instruction means for determining a currently available electrical current capacity of at least one power supply that supplies said disk drive array.

24. The program product of claim 19, wherein said program instruction means for determining a startup metric of each of said plurality of disk drives comprises program instruction means for determining a transient startup current parameter for each of said plurality of disk drives.

25. The program product of claim 24, wherein said program instruction means for scheduling said plurality of disk drives into designated disk drive start-up groups, further comprises:
program instruction means for scheduling disk drives having relatively highest transient startup current parameters into an initial startup group and a minimum number of subsequent start-up groups in compliance with said currently available power supply resource capacity;
program instruction means for scheduling disk drives having intermediate transient startup current parameters into a minimum number of one or more subsequent start-up groups in compliance with said currently available power supply resource capacity; and program instruction means for scheduling disk drives having relatively lowest transient startup current parameters among said initial startup group and said subsequent startup groups to minimize the number of sequentially activated startup groups required to comply with said determined power supply resource capacity.

26. The program product of claim 19, wherein said program instruction means for determining a startup metric of each of said plurality of disk drives comprises program instruction means for determining a spin-up time parameter for each of said plurality of disk drives.

27. The program product of claim 26, wherein said program instruction means for scheduling said plurality of disk drives into designated disk drive startup groups, further comprises:

program instruction means for scheduling disk drives having relatively longest spin-up times into an initial startup group and a minimum number of subsequent startup groups in compliance with said currently available power supply resource capacity;

program instruction means for scheduling disk drives having intermediate spin-up times into a minimum number of subsequent startup groups in compliance with said currently available power supply resource capacity; and program instruction means for scheduling disk drive having relatively shortest spin-up times among said initial startup group and said subsequent startup groups to minimize the number of sequentially activated startup groups required to comply with said determined power supply resource capacity.

* * * * *

UNITED STATES PATENT AND TRADEMARK OFFICE
CERTIFICATE OF CORRECTION

PATENT NO. : 6,966,006 B2
APPLICATION NO. : 10/142142
DATED : November 15, 2005
INVENTOR(S) : Pacheco et al.

It is certified that error appears in the above-identified patent and that said Letters Patent is hereby corrected as shown below:

column 11, line 17, delete "tinting" and insert --timing--.

column 13, line 7, delete "wit" and insert --with--.

Signed and Sealed this

Twelfth Day of September, 2006

JON W. DUDAS
*Director of the United States Patent and Trademark Office*